US009698842B2

(12) United States Patent
Gale et al.

(10) Patent No.: US 9,698,842 B2
(45) Date of Patent: Jul. 4, 2017

(54) PROCESSING INTERFERENCE IN A WIRELESS NETWORK

(71) Applicant: AceAxis Limited, Essex (GB)

(72) Inventors: Simon Gale, Essex (GB); David Bevan, Essex (GB); Fiona Wilson, Essex (GB)

(73) Assignee: ACEAXIS LIMITED, Essex (GB)

( * ) Notice: Subject to any disclaimer, the term of this patent is extended or adjusted under 35 U.S.C. 154(b) by 0 days.

(21) Appl. No.: 14/853,835

(22) Filed: Sep. 14, 2015

(65) Prior Publication Data

US 2016/0006468 A1    Jan. 7, 2016

Related U.S. Application Data

(63) Continuation of application No. PCT/GB2014/050842, filed on Mar. 17, 2014.

(30) Foreign Application Priority Data

Mar. 15, 2013  (GB) .................................. 1304834.3

(51) Int. Cl.
| H04B 1/00 | (2006.01) |
| H04B 1/10 | (2006.01) |
| H04B 1/12 | (2006.01) |
| H04B 7/00 | (2006.01) |

(52) U.S. Cl.
CPC ........... H04B 1/1036 (2013.01); H04B 1/123 (2013.01)

(58) Field of Classification Search
CPC ..... H04B 1/10; H04B 17/0087; H04W 28/04; H04W 28/048

USPC .............................. 455/63.1, 67.13, 295, 296
See application file for complete search history.

(56) References Cited

U.S. PATENT DOCUMENTS

| 2011/0075754 A1 | 3/2011 | Smith |
| 2012/0295558 A1 | 11/2012 | Wang et al. |

FOREIGN PATENT DOCUMENTS

| WO | 2009082084 A1 | 7/2009 |
| WO | 2013175193 A1 | 11/2013 |
| WO | 2013175194 A2 | 11/2013 |

OTHER PUBLICATIONS

International Search Report and Written Opinion issued on Aug. 29, 2014 to related application PCT/GB2014/050842 filed Mar. 17, 2014.

*Primary Examiner* — Lee Nguyen
(74) *Attorney, Agent, or Firm* — EIP US LLP

(57) ABSTRACT

Interference ($I_3$) in a waveform received at a device in a wireless network is processed, the processing, for example, being used to detect and/or reduce the interference. The interference comprises non-linear products of at least a first signal. On the basis of at least the first signal, a plurality of interference product streams are generated, each stream comprising a stream of time samples of a simulated non-linear product of at least the first signal. At least two of the plurality of interference product streams are processed to reduce a degree of correlation between said at least two interference product streams thereby producing at least two processed interference product streams, which are correlated with the received waveform to produce a plurality of respective correlation values. The interference is processed in dependence on the plurality of respective correlation values.

23 Claims, 9 Drawing Sheets

$$(A\cos(a) + B\cos(b))^5 =$$

$$\frac{5}{8}A^5\cos(a) + \frac{5}{16}A^5\cos(3a) + \frac{1}{16}A^5\cos(5a) +$$
$$\frac{10}{8}A^4B\cos(a-b) + \frac{5}{8}A^4B\cos(4a+b) + \frac{5}{4}A^4B\cos(a+b) + \frac{5}{8}A^4B\cos(3a+b) + \frac{5}{8}A^4B\cos(3a-b) + \frac{5}{8}A^4B\cos(4a-b) +$$
$$\frac{5}{8}A^3B^2\cos(a) + \frac{15}{8}A^3B^2\cos(2a+b) + \frac{15}{8}A^3B^2\cos(2a-b) + \frac{5}{4}A^3B^2\cos(3a) + \frac{5}{8}A^3B^2\cos(3a+2b) + \frac{5}{8}A^3B^2\cos(3a-2b) +$$
$$\frac{5}{8}A^2B^3\cos(b) + \frac{15}{8}A^2B^3\cos(2b+a) + \frac{15}{8}A^2B^3\cos(2b-a) + \frac{5}{4}A^2B^3\cos(3b) + \frac{5}{8}A^2B^3\cos(3b+2a) + \frac{5}{8}A^2B^3\cos(3b-2a) +$$
$$\frac{10}{8}AB^4\cos(a-b) + \frac{5}{8}AB^4\cos(a+2b) + \frac{5}{4}AB^4\cos(b) + \frac{15}{8}AB^4\cos(a+2b) + \frac{5}{4}AB^4\cos(3b+a) + \frac{5}{16}AB^4\cos(a+4b) +$$
$$\frac{5}{8}A^2B^3\cos(3b) + \frac{5}{8}B^5\cos(b) + \frac{5}{16}B^5\cos(3b) + \frac{1}{16}B^5\cos(5b)$$

$A = A_a(t); B=B_b(t) \to$ Amplitude Modulation (A.M.)

$a = 2\pi f_a t + \phi_a(t); b = 2\pi f_b t + \phi_b(t) \to$ carrier plus Phase Modulation (P.M.)

Figure 3

PROCESSING INTERFERENCE IN A WIRELESS NETWORK

CROSS-REFERENCE TO RELATED APPLICATIONS

This application is a continuation of International Application No. PCT/GB2014/050842, filed Mar. 17, 2014, which claims priority to United Kingdom Patent Application No. GB 1304834.3, filed Mar. 15, 2013. Each of the above-referenced patent applications is incorporated by reference in its entirety.

BACKGROUND OF THE INVENTION

Field of the Invention

The present application relates generally to methods and apparatus for processing interference due to non-linear products of transmitted signals in a wireless network, and more specifically, but not exclusively, to detection and reduction of interference caused to a receiver due to passive intermodulation (PIM) and/or passive harmonic (PH) products.

Description of the Related Technology

Non-linear products may be generated in a wireless network when one or more signals are transmitted along a signal path including a component having a non-linear transmission characteristic; these products differ in frequency from the signal or signals from which they were generated, and may potentially cause interference to other signals. The generation of non-linear products is becoming a problem of increasing importance in modern wireless communication systems, and in particular cellular wireless systems, since the radio frequency spectrum available has been steadily expanded as additional bands have become available, and the pattern of allocation of uplink and downlink bands within the available spectrum for use by various cellular systems, such systems using GERAN (GSM EDGE Radio Access Network), UTRAN (UMTS Terrestrial Radio Access Network) and E-UTRAN (Evolved UMTS Terrestrial Radio Access Network) radio access networks, and by various operators, is complex and territorially dependent. In this environment, and in particular at a cellular radio base station, it is likely that circumstances arise in which non-linear products generated from transmitted carriers in one or more downlink bands would fall within an uplink band in which signals are received at the base station. Non-linear products generated by non-linear characteristics of active components such as power amplifiers may generally be dealt with at a design stage by appropriate frequency management and filtering, but non-linear products caused by non-linear characteristics of passive components, for example passive intermodulation (PIM) products and/or passive harmonic (PH) products, may prove more difficult to manage. Many passive components may exhibit a non-linear transmission characteristic to some degree, for example due to an oxide layer at a metal to metal contact, and the non-linear characteristic may develop with time as an ageing process of the component. Furthermore, PIM and/or PH may be caused by components in the signal path between the transmitter and the receiver that are external to the transceiver equipment and which may be outside the operator's control, such as metallic objects on the antenna tower or other objects in the signal path through the propagation environment, such as fences; this is known as the "rusty bolt" effect.

Interference due to PIM and/or PH may reduce the carrier to interference ratio at a receiver, which may reduce coverage by a cell significantly. Conventionally, as a solution to the problem of suspected interference caused by passive non-linear products in a cellular radio network, the source of the passive non-linear products may be tracked down by field engineers and a component causing the interference may be replaced. However, this is labor intensive and relies on the problem being identified in order to alert the field engineers.

The applicant's patent applications WO2013/175194 and WO2013/175193 address the detection and cancellation of interference caused by non-linear products of transmitted signals. Simulated interference signals are generated from a transmitted signal or signals, the simulated interference signals comprising simulated non-linear products of the transmitted signal or signals. The simulated interference signals may be correlated with a received waveform to detect whether or not the simulated non-linear products correspond to non-linear products that are present in received interference. If they are, the interference in the received waveform may be reduced by combining the simulated interference signals with received signals with an appropriate amplitude and phase relationship to cancel or reduce the interference.

In some circumstances the reduction of interference in the received waveform is limited when more than one simulated non-linear product is combined with the received waveform.

It is an object of embodiments to address at least some of the limitations of the prior art systems.

SUMMARY

In accordance with a first aspect, there is provided a method of processing interference in a waveform received at a device in a wireless network, the interference comprising non-linear products of at least a first signal, the method comprising: generating, on the basis of at least the first signal, a plurality of interference product streams, each stream comprising a stream of time samples of a simulated non-linear product of at least the first signal; processing at least two of the plurality of interference product streams to reduce a degree of correlation between said at least two interference product streams thereby producing at least two processed interference product streams; correlating said at least two processed interference product streams with the received waveform to produce a plurality of respective correlation values; and processing the interference in dependence on the plurality of respective correlation values.

This has an advantage that, by processing the at least two of the plurality of interference product streams to reduce a degree of correlation between them, for example by an orthogonalization process, a greater degree of reduction of interference by cancellation may be achieved when the processed interference product streams are combined with a received waveform comprising the interference than may typically be achieved without the processing. This may be due to correlations between the unprocessed interference product streams having the effect that cancellation by one stream tends to counteract cancellation by another stream. As a result, overall cancellation depth is reduced when using unprocessed interference product streams, since cancellation by each successive stream tends to undo the cancellation achieved by the preceding stream, for example in an iterative cancellation process. In a parallel cancellation process, cancellation depth is also reduced by interaction between the unprocessed streams. By contrast, the cancellation is improved if the interference product streams are processed, in an embodiment of the invention, to reduce a degree of correlation between interference product streams.

Furthermore, by processing the at least two of the plurality of interference product streams to reduce a degree of correlation between them, for example by an orthogonalization process, detection of interference may be improved, in that the amount or proportion of respective products at each exponent may be more accurately estimated.

In an embodiment of the invention, the processing of the interference comprises: weighting each processed interference product stream in dependence on the respective correlation value for the stream; and combining each weighted processed interference product stream with the received waveform comprising the interference, whereby to reduce the interference in the received waveform.

This has an advantage that each processed interference product stream may be weighted with an appropriate amplitude and phase shift in order to align it substantially in anti-phase with an interference product in a received waveform that is to be cancelled. If the degree of the correlation between the interference product steams is reduced, then each stream may be weighted without substantially affecting the cancellation achieved using other interference product streams.

In an embodiment of the invention, the processing of the at least two of the plurality of interference product streams comprises generating at least one processed interference product stream that is a linear combination of the at least two of the plurality of interference product streams.

This has an advantage that a processed interference product stream may be generated conveniently by a linear combination achieved by amplitude and phase weighting of one interference product stream with respect to another, and then combination of the two streams to produce a processed interference product stream.

In an embodiment of the invention, each time sample of said at least one processed interference product stream is a linear combination of each corresponding time sample of the at least two of the plurality of interference product streams. However, one or more of the processed interference product streams may consist of time samples derived from only one interference product stream, in which case the processing may leave the interference product stream unchanged, or normalized by a factor.

This has an advantage that the processed interference product stream may be produced on the basis of current time samples in a real time process.

In an embodiment of the invention, the processing of the at least two of the plurality of interference product streams to reduce a degree of correlation between said at least two interference product streams comprises: processing a correlation matrix representing correlations between the plurality of interference product streams to produce a second matrix; and multiplying the at least two interference streams by the second matrix to produce the processed interference streams.

This has an advantage that the processed interference streams may be produced efficiently. The second matrix may comprise, for example, an array of amplitude and phase weighting values.

In an embodiment of the invention, the method comprises calculating the correlation matrix on the basis of samples of the plurality of interference product streams received during a first period; and performing said processing of the plurality of interference product streams to reduce the degree of correlation between said at least two interference streams using samples of the plurality of interference product streams received during a second period, different from the first period.

This has an advantage that the calculation of the correlation matrix may be performed infrequently or in non-real time to produce the second matrix, reducing the requirement for processing resource. The second matrix may be applied in real time to reduce the degree of correlation between the interference streams. Application of the second matrix, which may involve weighting and summing some or all of the plurality of interference product streams, may be relatively straightforward and less demanding of processing resources to perform in real time in comparison with the calculation of the correlation matrix. This may be particularly advantageous when the correlation matrix is expected to be static or slowly varying in relation to the sampling time.

In an embodiment of the invention, the correlation matrix represents statistical properties of the plurality of interference product streams received during the first period.

This has an advantage that, if the statistical properties of the plurality of interference product streams remain substantially constant or are slowly varying, the calculation representing interference streams received in the first period may be valid outside the first period.

In an embodiment of the invention, the statistical properties comprise an amplitude distribution.

In an embodiment of the invention, processing the correlation matrix to produce the second matrix comprises determining the inverse of the square root of the correlation matrix.

This has the advantage that the second matrix may be conveniently produced.

In an embodiment of the invention, the method comprises producing the second matrix by a process involving a Cholesky decomposition and a matrix inversion.

This has an advantage that the second matrix may have a triangular form, in which some of the terms typically have a value of 0, so that the process of processing interference product streams by applying the second matrix in the form of weights is simplified, as some weights will typically have the trivial values of 0.

In an embodiment of the invention, the processing of the at least two interference product streams to reduce a degree of correlation between said at least two interference product streams comprises: vector decomposition of at least one of the at least two interference product streams into: a first decomposed interference product stream which is arranged to be substantially correlated with a first of the at least two interference product streams; and a second decomposed interference product stream which is arranged to be substantially orthogonal to the first of the at least two interference product streams: and selecting the second decomposed interference product stream as one of the processed interference product streams.

This has an advantage that the processing to reduce the degree of correlation may be performed efficiently.

In an embodiment of the invention, the processing of the at least two interference product streams to reduce a degree of correlation between said at least two interference product streams comprises a Gram-Schmidt orthogonalization process.

This provides a convenient method of processing to reduce the degree of correlation.

In an embodiment of the invention, the method comprises processing at least the first signal at baseband to generate the plurality of interference product streams comprising non-linear products at baseband.

This has an advantage that it provides an efficient way of generating and processing the plurality of interference product streams.

In an embodiment of the invention, the method comprises frequency shifting a processed interference product stream to align in frequency with a downconverted non-linear product in the interference to the received waveform.

This has an advantage of removing a frequency offset between the downconverted non-linear product and the processed interference product stream to facilitate the correlation.

In an embodiment of the invention, the non-linear products of at least the first signal comprise at least one passive intermodulation (PIM) product of the first signal and a second signal. Alternatively or in addition, the non-linear products of at least the first signal comprise at least one passive harmonic (PH) product of the first signal.

In an embodiment of the invention, the method comprises generating the plurality of interference product streams on the basis of samples of at least the first signal derived at baseband from a downlink data stream from a base station baseband unit to a remote radio head unit.

This has an advantage that baseband samples of at least the first signal may be conveniently accessed before transmission without requiring to receive the first signal at radio frequency and downconvert to baseband.

In an embodiment of the invention, the downlink data stream is a Common Public Radio Interface (CPRI) or Open Base Station Architecture Initiative (OBSAI) data stream.

In an embodiment of the invention, the processing of the interference comprises: detecting the presence of a non-linear product of at least the first signal in the interference in dependence on at least one of the plurality of respective correlation values.

This has an advantage that an indication can be provided to an operator that interference comprising the non-linear product has been detected.

In an embodiment of the invention, the method comprises identifying which non-linear products are present in the interference in dependence on the plurality of respective correlation values.

This has an advantage that specific non-linear products may be detected with greater confidence than may be the case with un-processed interference product streams.

In an embodiment of the invention, the method comprises identifying to which exponent value a non-linear product present in the interference relates in dependence on at least one of the plurality of respective correlation values.

This has an advantage that a specific exponent value to which a non-linear product relates may be detected with greater confidence than may be the case with un-processed interference product streams.

In an embodiment of the invention, the method comprises identifying which exponent values relate to non-linear products present in the interference in dependence on the plurality of respective correlation values.

This has an advantage that it may be determined which exponent values are contributing to the interference, which may be useful in predicting which frequency bands may experience interference outside the frequency band of the received waveform.

In accordance with a second aspect, there is provided apparatus for processing interference in a waveform received at a device in a wireless network, the interference comprising non-linear products of at least a first signal, the apparatus comprising a processor arranged to: generate, on the basis of at least the first signal, a plurality of interference product streams, each stream comprising a stream of time samples of a simulated non-linear product of at least the first signal; process at least two of the plurality of interference product streams to reduce a degree of correlation between said at least two interference product streams thereby producing at least two processed interference product streams; correlate said at least two processed interference product streams with the received waveform to produce a respective correlation value; and process the interference in dependence on the respective correlation values.

Further features and advantages of embodiments will be apparent from the following description of various embodiments, which are given by way of example only.

BRIEF DESCRIPTION OF THE DRAWINGS

FIG. 3 shows generation of non-linear products from two signals operated on by a non-linear function having an exponent 5 term, illustrating that the products generated include third order terms;

DETAILED DESCRIPTION OF CERTAIN INVENTIVE EMBODIMENTS

By way of example, embodiments of the invention will now be described in the context of detection and reduction of interference caused by non-linear products, typically passive intermodulation (PIM) products and/or passive harmonic (PH) products, in cellular wireless networks such as GSM, 3G (UMTS) and LTE (Long Term Evolution) networks comprising GERAN, UTRAN and/or E-UTRAN radio access networks, but it will be understood that embodiments of the invention may relate to other types of radio access network, for example IEEE 802.16 WiMax systems, and that embodiments of the invention are not restricted to cellular wireless system. Furthermore, embodiments of the invention may also relate to reduction of interference caused by intermodulation or harmonics in active components.

Figure 1:
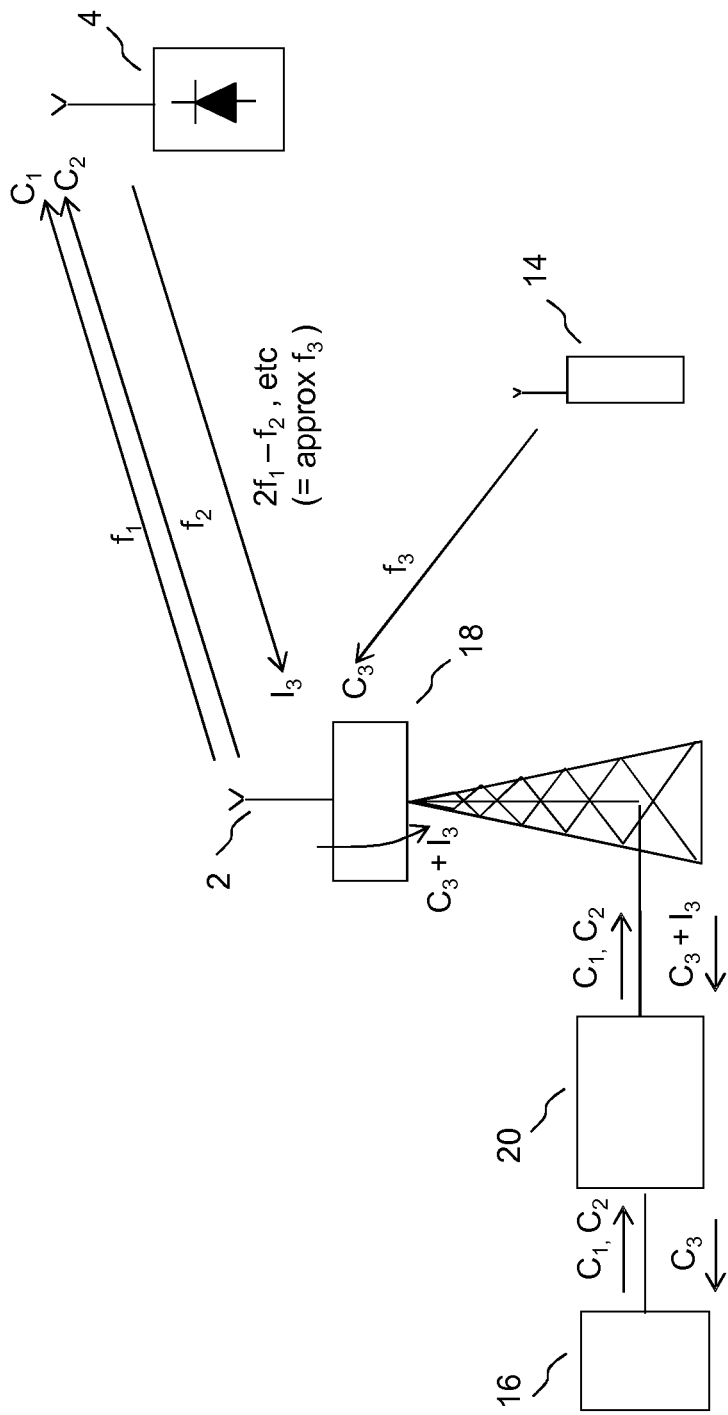
FIG. 1 is a is schematic diagram illustrating an example of interference caused by passive non-linear products.

FIG. 1 shows an example of a scenario in which interference $I_3$ due to non-linear products, such as PIM or PH products, may be experienced in a received waveform in a cellular wireless network, and the interference may be detected and/or reduced by detector/canceller apparatus 20 in an embodiment of the invention. The detector/canceller apparatus may operate, in the embodiment, by generating simulated non-linear products that simulate non-linear products that may be present in the received interference, and then by correlating each simulated non-linear product with the received waveform. From the correlation, it may be established whether or not a corresponding non-linear product is in fact present in the received waveform, and if it is, what the amplitude and phase relationship is between the received non-linear product and the simulated non-linear product. Each simulated non-linear product may then be combined with the received waveform with an appropriate amplitude and phase relationship, determined from the correlation, to cancel or at least reduce the interference in the received waveform.

The detector/canceller apparatus 20 may generate a simulated non-linear product in the form of a stream of time samples, and may generate several such interference product streams. Each stream may be appropriately weighted and combined with the received waveform to reduce each of the non-linear products in the received interference. However, it has been found that in many cases, cancellation by one stream tends to counteract cancellation by another stream, so that overall cancellation depth is reduced. In an embodiment of the invention, the interference product streams are processed to reduce a degree of correlation between each stream and the other streams, that is to say to orthogonalize the streams with respect to each other, before correlating the processed streams with the received waveform. The processed streams may then be combined with the received waveform, using amplitude and phase weights determined, for example, from the correlations, and the resulting reduction in interference is typically greater than may be achieved with unprocessed streams.

Furthermore, by processing the at least two of the plurality of interference product streams to reduce a degree of correlation between them, for example by an orthogonalization process, detection of interference may be improved, in that the amount or proportion of respective products at each exponent may be more accurately estimated.

Relative delays and frequency offsets between the received and simulated non-linear products may be determined by a trial of candidate values, and appropriate values may be selected on the basis of increasing, or maximizing, the value of a correlation between the received and simulated non-linear products. The processed streams may then be combined with the received waveform, using the determined relative delays and frequency offsets and the amplitude and phase weights.

Considering further the scenario illustrated in FIG. 1, a first downlink signal $C_1$ and a second downlink signal $C_2$ are sent at baseband from a base station modem unit 16 to a Remote Radio Head (RRH) unit 18 as a data stream on a data link such as a Common Public Radio Interface (CPRI) data link. The data link carries both uplink and downlink CPRI data streams. The base station modem unit may be referred to as a baseband unit, and is typically, although not necessarily, mounted in a cabinet on the ground. The Remote Radio Head comprises upconverter and downconverter units and is typically, but not necessarily, mounted on a tower at the base station next to the antenna 2 or antennas. The first signal $C_1$ and second signal $C_2$ are upconverted to radio frequency and are transmitted at frequency $f_1$ and frequency $f_2$ respectively. In the example shown in FIG. 1, the first and second signals impinge upon a source 4 of non-linear interference products such as passive intermodulation products (PIM) products. The source may, for example, be a metallic component having an oxide layer between metallic parts or comprising a ferromagnetic material. The source may be a component of the RRH 18 such as, for example a diplexer or antenna, or the source may be a component remote from the RRH, such as an oxidized component on an antenna tower. In addition to PIM products, Passive Harmonic products of each of the first signal and the second signal may be generated.

Figure 2:
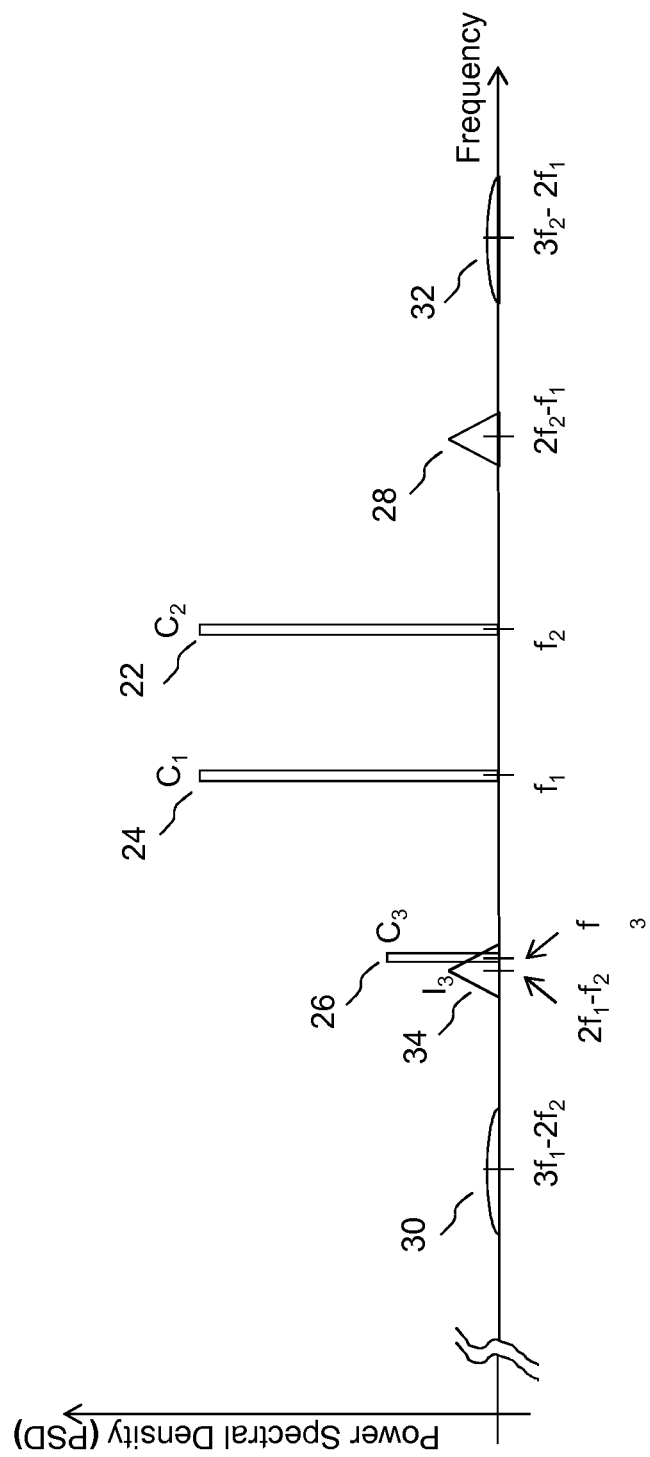
FIG. 2 is a schematic diagram illustrating passive non-linear products in the frequency domain.

FIG. 2 shows intermodulation products in the frequency domain. It can be seen that the first signal 24 at frequency $f_1$ and the second signal 22 at frequency $f_2$ may produce, for example, third order products 34, 28 at frequencies $2f_1-f_2$ and $2f_2-f_1$, and fifth order products 30, 32 at frequencies $3f_1-2f_2$ and $3f_2-2f_1$. Other products (not shown) may also be generated.

In the case illustrated by FIG. 2, an uplink signal, i.e. a received signal $C_3$ 26 at frequency $f_3$ falls within the frequency spectrum occupied by the low side third order intermodulation products 34. It can be seen that there is typically an offset between the frequency of the received signal 26 and the center of the frequency spectrum occupied by the low side third order intermodulation products 34, since there is typically no reason to expect the frequencies to be equal. The intermodulation products typically occupy a broader band than the signals from which they are generated, and there may be more than one received signal falling within the spectrum occupied by the intermodulation products.

Referring again to FIG. 1, it can be seen that intermodulation products $I_3$ of the first and second signals are transmitted from the PIM source 4, in this example at $2f_1-f_2$. The intermodulation products $I_3$, in this example, fall at least in part, within a received uplink channel at $f_3$ and appear as interference to a received signal $C_3$ that is transmitted at radio frequency from, for example, a user equipment 14 in communication with the base station. The received signal $C_3$ and the intermodulation products $I_3$ appearing as interference to the received signal are received in a waveform at a device in the wireless network; the device may be for example an antenna, in the case that the interference is generated externally to the receiving radio system, or the device may for example be a component of the receive chain of the receiving radio system, for example a baseband processor, in the case that the interference is generated in the receiving radio system itself, such as for example PIM generated in the antenna or a diplexer. The received waveform may be downconverted to baseband in the RRH 18 and sent on the data link to the baseband/modem unit 16. The designations $C_1$, $C_2$ and $C_3$ are used to designate the first, second and third signals irrespective of the carrier frequency. That is to say, the first signal may be designated as $C_1$ at radio frequency as transmitted by an antenna, but it is also designated as $C_1$ and referred to as the first signal at baseband, that is to say at zero or near zero intermediate frequency. Similarly, the term "received waveform" is used to refer to radio frequency, intermediate frequency or baseband representation of the received waveform, independently of carrier frequency. The received waveform may be in analogue or sampled data form.

In an embodiment of the invention, as shown in FIG. 1, apparatus 20 is provided for reduction of interference to a received signal on at least a single receive channel caused by non-linear products of at least the first signal and the second signal, the first and second signals being downlink signals.

The first and second signals $C_1$ and $C_2$ are received at baseband at the apparatus, for example from the data link from the base station modem unit. The apparatus (which may be referred to as a PIM canceller) may select the first signal $C_1$ and the second signal $C_2$ on the basis of a determination of which downlink signal frequencies may produce non-linear products that may fall within a channel of interest that carries the received signal, based on well-known relationships between signal frequencies and the frequencies of non-linear products produced from those frequencies. On the basis of this determination, the appropriate first and second downlink signals $C_1$ and $C_2$ may be selected for generation of simulated, that is to say synthesized, non-linear products. On the basis of the first signal and the second signal, simulated non-linear products are generated. The non-linear product or products that are generated may be selected on the basis of which non-linear products would be expected to fall in the channel of interest.

The processing of the first signal (for PH products), and the first and second signal (for PIM products) to generate interference product streams, each stream comprising a stream of time samples of a simulated non-linear product of at least the first signal may be carried out as follows.

As an example, generation of streams of third order intermodulation products of two signals is considered; similar principles apply to generation of other non-linear products and non-linear products of other orders. It will be shown that several third order intermodulation products can be generated by an exponent 3 non-linear term, and that several further third order products may be generated by an exponent 5 term, and also yet further third order products may be generated by other odd exponent terms. An exponent 3 term is a term of the form $x^3$ in a transfer function of a non-linear device generating interference, or in a corresponding function for generating simulated non-linear products to cancel the interference, and in general an exponent n term is a term of the form $x^n$.

Not all third order intermodulation products that are generated will fall within a band of interest corresponding to a received waveform, potentially representing interference to a received signal.

So, in order to cancel interference in a received waveform, potentially interfering non-linear products may be selected for generation as streams of time samples of simulated non-linear products, and non-linear products that would fall outside the band of interest may be neglected.

So, interference product streams may need to be generated for each of several non-linear products, the non-linear products not necessarily all relating to the same exponent term.

Considering non-linear products generated by an exponent 3 term, from two signals each signal having amplitude modulation A and B respectively, and a phase comprising carrier phase and phase modulation a and b respectively, products due to a non-linearity with exponent 3 are given by:

$$(A \cos(a) + B \cos(b))^3$$

which may be expanded to give:

$$\tfrac{1}{4}(3A^3 \cos(a) + A^3 \cos(3a) + 3A^2B \cos(2a-b) + 3A^2B \cos(2a+b) + 3AB^2 \cos(a-2b) + 3AB^2 \cos(a+2b) + 6AB^2 \cos(a) + 6A^2B \cos(b) + 3B^3 \cos(b) + B^3 \cos(3b))$$

The terms of the expansion which are of interest in the present example, in that they may fall in an uplink receive band, are the terms $3A^2B \cos(2a-b)$, which represents the lower third order product as shown in FIG. 2 as $I_3$ as indicated by reference numeral 34, and $3AB^2 \cos(a-2b)$, which may also be written as $3AB^2 \cos(2b-a)$, which represents the upper third order product as shown as indicated in FIG. 2 by reference numeral 28. Products which appear at the fundamental frequencies, and at or around the third harmonics need not be generated, in some embodiments, as baseband intermodulation products in the PIM canceller, since they may be filtered out at a victim receiver. Which of the 'upper' or 'lower' products falls in an uplink receive band will depend upon whether the uplink band is allocated above or below the downlink band. The mathematics above shows that the intermodulation products contain amplitude and phase modulation which is a function of modulation of the first and second signals which generated the intermodulation products, and that baseband intermodulation products may be generated in the PIM canceller from the knowledge of the amplitude and phase of the first and second signals; this information is available in a baseband representation of the first and second signals. For example, to cancel interference $I_3$ as shown in FIG. 2, the lower third order products may be selected for generation as interference product streams.

However, in addition to the generation of third order intermodulation products by exponent 3 terms, i.e. cube terms, in a device transfer function, intermodulation products may also be generated at the frequencies expected for third order products, such as $2f_1-f_2$ and $2f_2-f_1$, by exponent terms in a device transfer function of exponents 5, 7, 9, and potentially by any odd power device nonlinearities, where the power is at least as great as the power of the respective term of the device transfer function. Correspondingly, intermodulation products normally termed as 'fifth order' can actually be generated by device nonlinearities of exponents 5, 7, 9 and all higher odd exponent device nonlinearities. The pattern continues in this way for higher (odd) order intermodulation products (i.e. 'seventh', 'ninth' etc.), which can be generated not only by device nonlinearities of the same exponent, but also by device nonlinearities of higher odd exponents.

FIG. 3 shows an example of a mathematical expansion of $(A \cos(a) + B \cos(b))^5$, illustrating the generation of intermodulation products by an exponent 5 term in a device transfer function. The terms within broken lines have been highlighted as terms that may typically fall within a receive band in some arrangements of cellular radio uplink and downlink frequencies. In particular, the terms include cos (2a−b), and cos(a−2b), which correspond to the frequencies $2f_1-f_2$ and $2f_2-f_1$. Therefore, it may be seen that knowledge of, or estimation of, the mechanism for generating intermodulation products may be used to generate corresponding simulated intermodulation products.

Interference product streams may be generated from time samples of at least the first signal, by application of the appropriate mathematical function for the non-linear product in question. For the sake of example, one of the simulated non-linear products selected for generation may be the third order product having the mathematical function 5/4 $A^4B \cos(2a-b)$ in the exponent 5 expansion shown in FIG. 3, representing a product at $2f_1-f_2$. Time samples of the simulated non-linear product may be generated by applying the mathematical function to time samples of signals A and B. Here $A=A_a(t)$ and $B=B_b(t)$ represent amplitude modulation, and $a=2\pi f_a t + \phi_a(t)$ and $b=2\pi f_b t + \phi_b(t)$, represent phase modulation of signals A and B. Appropriate delays may be set in the cancellation paths to ensure that the time samples of the simulated non-linear product align in time with the interference which they are intended to cancel, since the interference is time variant in dependence on the content of the first and second signals in terms of amplitude and phase modulation. The amplitude and phase modulation may be as a result of, for example, OFDM, CDMA or GMSK modulation schemes used by the first and second signals A and B.

In the case of passive harmonic non-linear products, similarly to the case with PIM products, several interference product streams may be generated, as it is found that passive harmonic products of a given order may be generated by more than one exponent term. So, for example, second order passive harmonic products may be generated by exponent 2 terms, exponent 4 terms and higher even-numbered exponent terms. Several interference product streams may be generated, each comprising time samples of a harmonic product of a different exponent. It has been found that even-number order harmonics have contributions from even-number higher exponents, and odd-number order harmonics have contribution from odd-number higher exponents. Therefore, higher exponent terms may be generated to increase cancellation of a given order of harmonic. So, for example, a fourth order exponent term may generate components that fall on the second harmonic frequency, represented by cos(2a). Therefore, for cancellation of a second harmonic terms, each of several harmonic products comprising cos(2a) may be generated as simulated harmonic products, each typically being generated at baseband. The harmonic products contain amplitude and phase modulation which is a function of modulation of a first signal which generated the harmonic products. Baseband harmonic products may be generated from the knowledge of the amplitude and phase of the first signal; this information is available in a baseband representation of the first signal.

Figure 4:
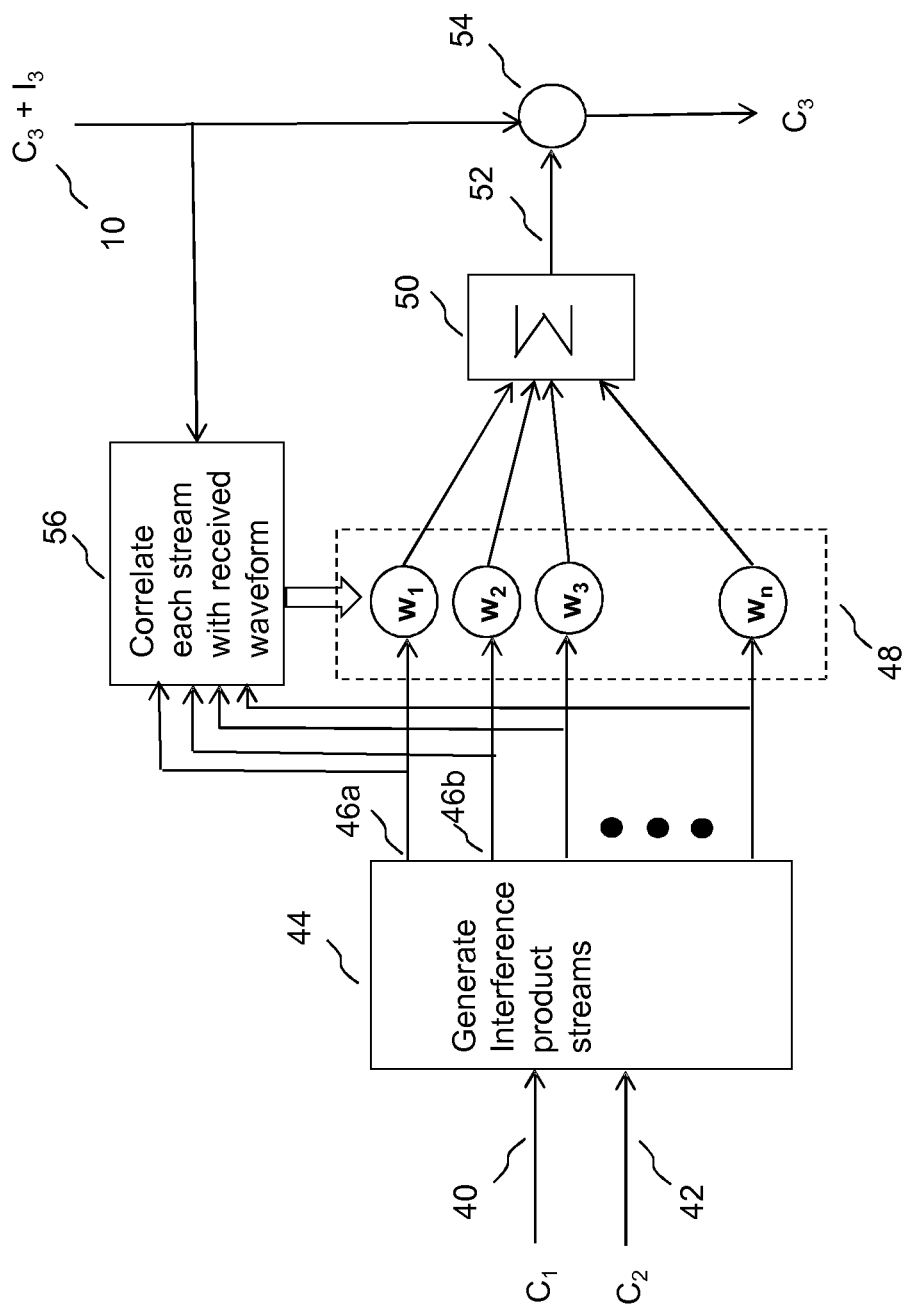
FIG. 4 is a schematic diagram illustrating reduction of interference caused by a passive non-linear product by combination of weighted interference product streams with a received waveform.

As shown in FIG. 4, each interference product stream, generated in a generator functional block 44 from at least a first signal $C_1$ 40 and in this example from a second signal $C_2$ 42 may be correlated in a correlator functional block 56 with a received waveform, in this case the received waveform comprising $C_3+I_3$, to produce a correlation value for each stream. Each correlation value may be used to produce a weight for the respective stream, the weights forming a weightset 48. Each weight may be applied to the respective interference product stream 46a, 46b, and the weighted streams may be summed in a summer 50 and to produce a simulated interference signal 52 which may be combined in a combiner 54 with the received waveform 10, in appropriately delayed and/or frequency shifted form, to reduce or cancel the interference 13.

However, as ready discussed, it has been found that the interference product streams 46a, 46b may interact to reduce the degree of cancellation in an arrangement such as that in FIG. 4.

Figure 5:
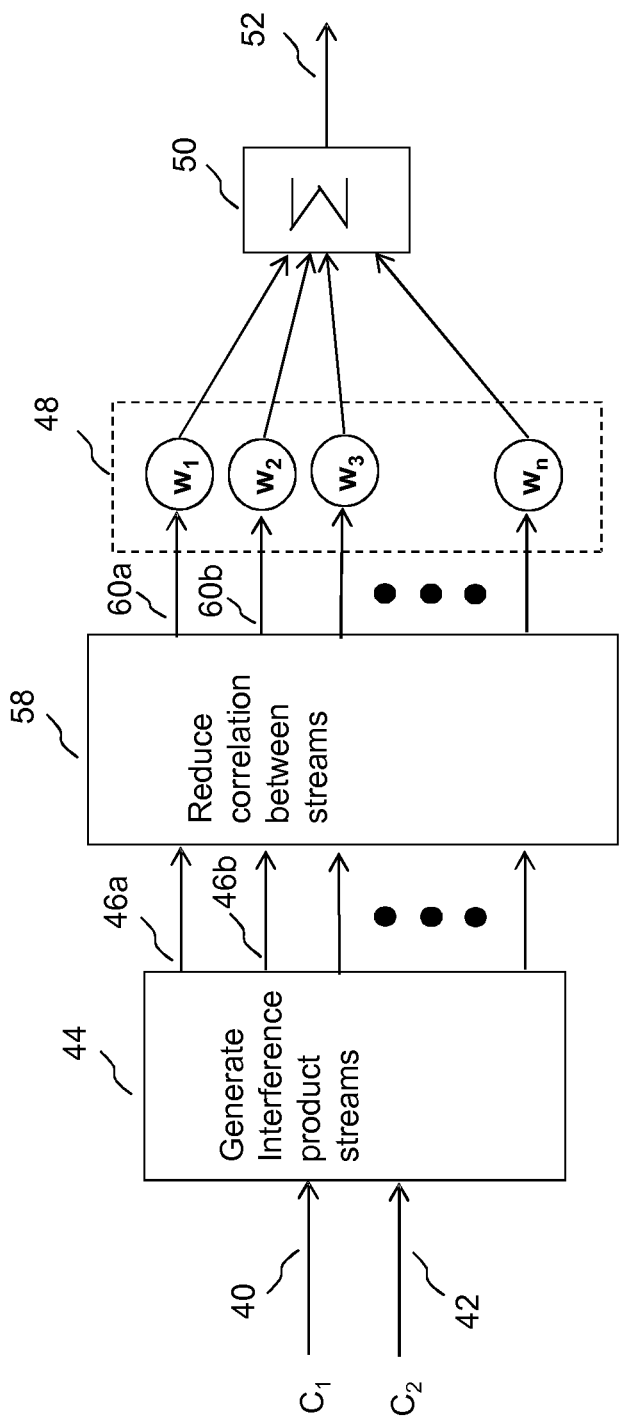
FIG. 5 is schematic diagram showing reduction of interference according to an embodiment of the invention in which correlation between interference product streams is reduced.

As shown in FIG. 5, in an embodiment of the invention, at least two of the interference product streams 46a, 46b are processed in a processing functional block 58 to reduce a degree of correlation between the streams. This may involve orthogonalizing the streams with respect to each other. Each stream may be orthogonalized with respect to each other stream. The at least two processed interference product streams 60a, 60b may be weighted by a weightset 48 and combined in a combiner 50 to produce a simulated interference signal 52 for use in cancelling interference in the received waveform.

Figure 6:
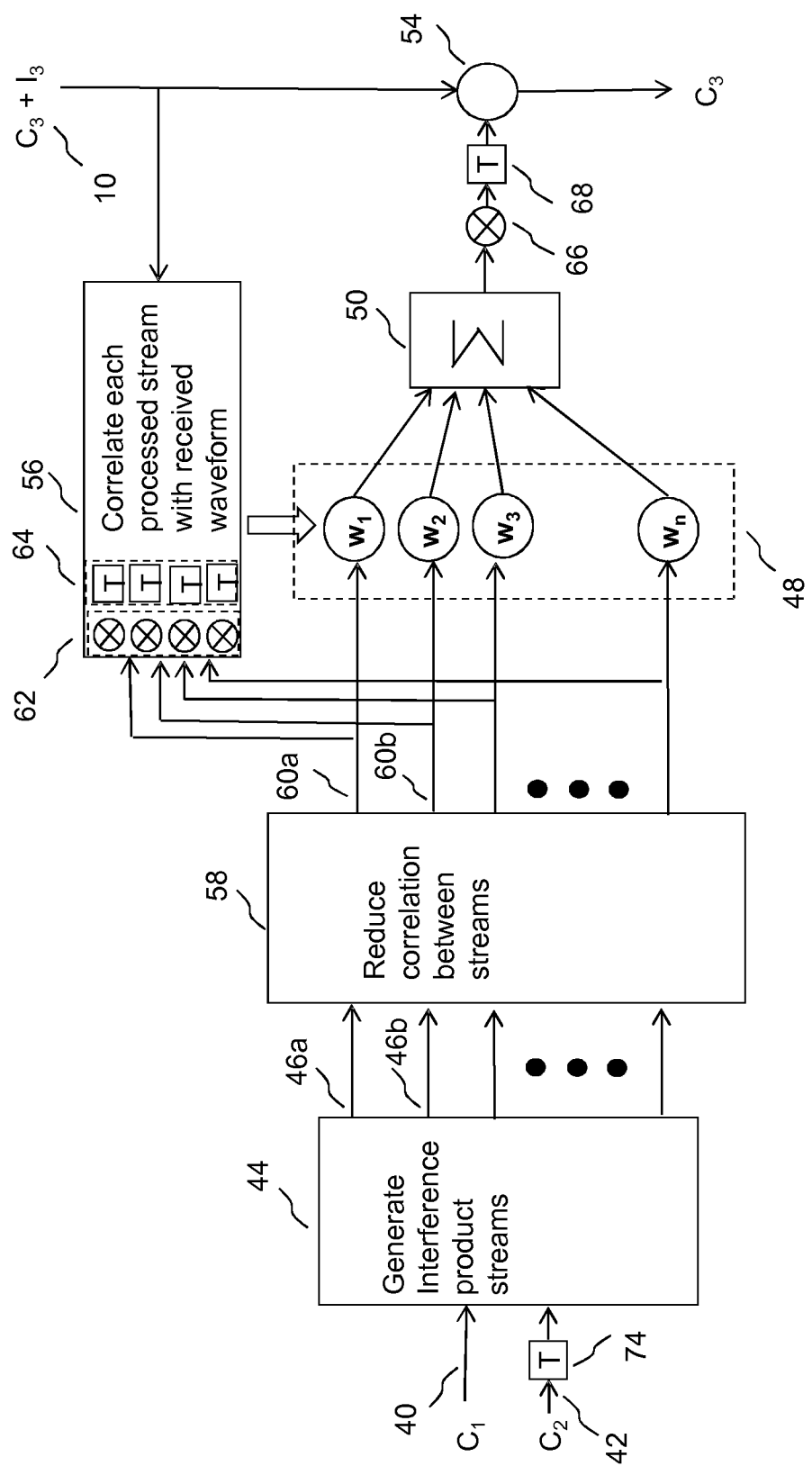
FIG. 6 is schematic diagram showing reduction of interference according to an embodiment of the invention in which each processed interference product stream is correlated with the received waveform.

As shown in FIG. 6, the processed, for example orthogonalized, interference product streams 60a, 60b may be correlated using a correlator functional block 56 with a received waveform 10 to produce a correlation value for each stream. The interference may then be processed in dependence on the respective correlation values. For example, each correlation value may be used to produce a weight, typically an amplitude and phase transfer function to be multiplied with each time sample, for the respective stream, forming a weightset 48. The correlation process in the correlation functional block 56 may involve multiplying the complex conjugate of each time sample of an interference product stream with a corresponding time sample of the received waveform, and averaging the resulting correlation for a number of samples to produce the respective weight. Each weight may be applied to the respective processed interference product stream 60a, 60b and the weighted streams may be summed using a summer 50 with the received waveform 10 comprising $C_3$ and $I_3$, in appropriately delayed and/or frequency shifted form, to reduce or cancel the interference.

It may be necessary to frequency shift the interference product streams generated at baseband with respect to the received waveform at baseband to reduce or cancel the interference in the received signal, so that simulated non-linear products are aligned in frequency with the corresponding non-linear products in the interference to the received waveform. This is because, as shown in FIG. 2, the center frequency of the non-linear products interfering with the received signal may not correspond with the center frequency of the received uplink channel of the received signal, but may be offset by an offset frequency.

As shown in FIG. 6, each processed interference product stream may be frequency shifted in a frequency shifting functional block 62 before correlation in the correlation functional block 56 relative to the received waveform. Also as shown in FIG. 6, the interference product streams may be frequency shifted in a frequency shifting functional block, such as a mixer, 66 relative to the received signal. In each case the relative frequency shifting may be achieved by frequency shifting the interference product streams and/or the received waveform.

As also shown in FIG. 6, the relative delay between the interference product streams and the received waveform may be adjusted by delay components 64, 68. In each case, the relative delay adjustment may be achieved by delay shifting the interference product streams and/or the received waveform. In addition, the relative delay between two signals $C_1$ 40 and $C_2$ 42 used to generate the interference product streams 46a, 46b may be adjusted, for example by using a delay element 74, by delaying either one in relation to the other. Each delay value applied by a respective delay element 74, 64 may be determined by varying the delay value and choosing a value that increases or maximizes a correlation value. A relative delay, for example as provided by a delay element 68 between the combined interference product streams and the received waveform 10, may be determined by varying a delay value applied by a delay element 62, for example to find a delay value to maximize the correlation, in a signal path to the correlation functional block 56. FIG. 6 shows the positions of frequency and delay adjustment elements in respective signal paths for the sake of example; it will be understood that other positions within the signal path could be chosen with a similar effect.

Figure 7:
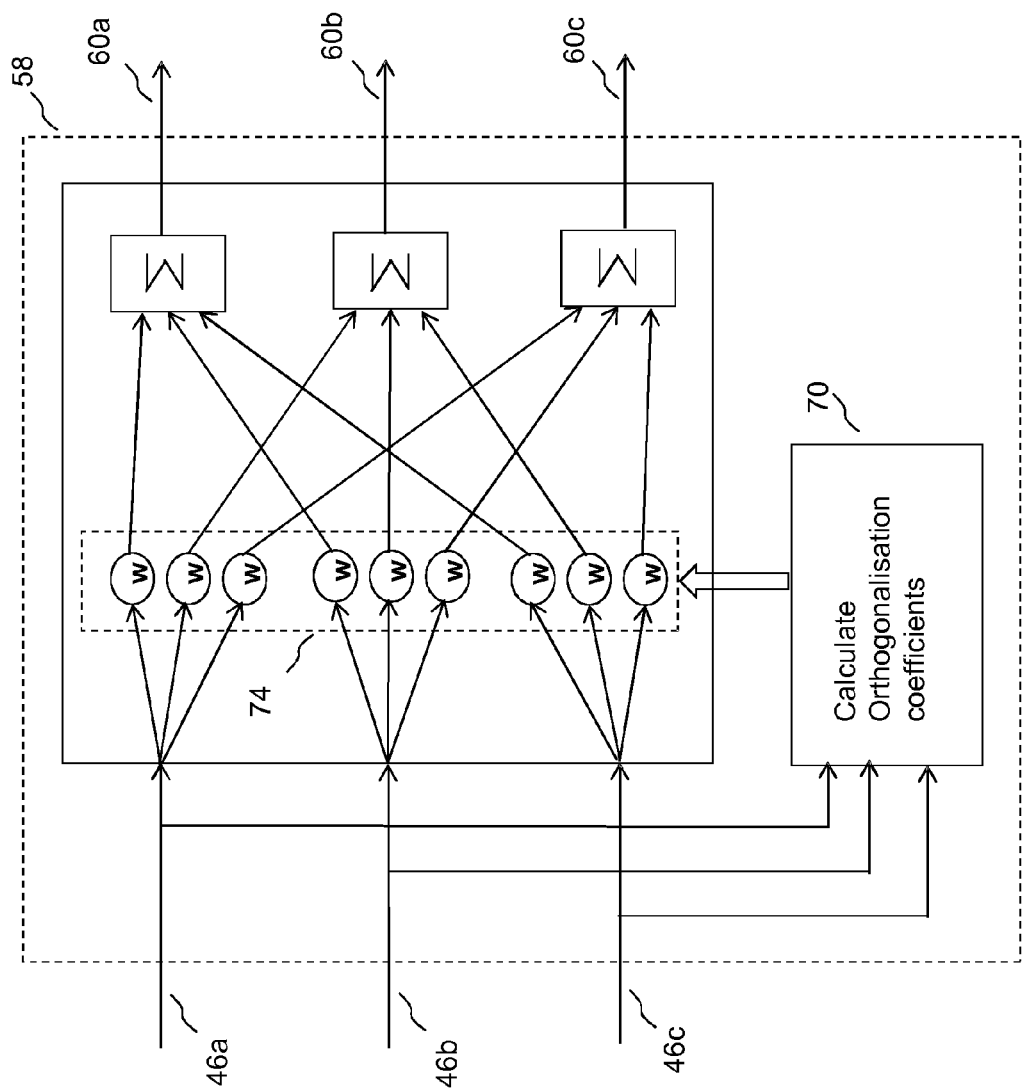
FIG. 7 is a schematic diagram showing reduction of correlation between interference product streams in an embodiment of the invention.

FIG. 7 shows an example of an implementation of the functional block 58 to reduce correlation between interference product streams, as shown in FIGS. 5 and 6. As can be seen from FIG. 7, interference product streams 46a, 46b, 46c are processed by linear combination of the streams to produce mutually orthogonalized interference product streams 60a, 60b, 60c. In the case of FIG. 7, the linear combination is achieved by applying a weighting matrix 74, that applies amplitude and phase weight to each interference product stream, for combination potentially with each other interference product stream. Some of the weighting values may be set to zero, so that in practice not all streams need be combined with all other streams. The weighting matrix 74 may be calculated by a processor 70 arranged to calculate the values of the weights in the weighting matrix, which may also be referred to as orthogonalization coefficients.

As can be seen, at least one processed interference product stream 60b is a linear combination of the at least two of the plurality of interference product streams 46a, 46b. Each time sample of each processed interference product stream may be a linear combination of each corresponding time sample of each of the interference product streams, so that the processed interference product streams may be produced on the basis current time samples in a real time process.

The processing of the interference product streams to reduce a degree of correlation between the interference product streams may comprise an orthogonalization process, that involves processing a correlation matrix representing correlations between the interference product streams to produce a second matrix, which may be referred to as a weighting matrix. The interference product streams may be multiplied by the second matrix to produce the processed interference streams. The correlation matrix may be calculated on the basis of samples of the interference product streams received during a first period, and the processing of the interference product streams to reduce the degree of correlation between the streams may use samples of the interference product streams received during a second period, different from the first period. The calculation of the correlation matrix may be performed infrequently or in non-real time to produce the second matrix, reducing the requirement for processing resource and the second matrix may be applied in real time. Application of the second matrix, which may involve weighting and summing some or all of the plurality of interference product streams, may be relatively straightforward and less demanding of processing resources to perform in real time in comparison with the calculation of the correlation matrix, which may not need to be performed in real time. This may be particularly advantageous when the correlation matrix is expected to be static or slowly varying in relation to the sampling time. So, although the correlation matrix may represent statistical properties, such as amplitude distribution, of the interference product streams received during the first period, provided the statistical properties of the interference product streams remain substantially constant or are slowly varying, the calculation representing interference streams received in the first period may be expected to be valid outside the first period. As a result, occasional re-calculation of the correlation matrix may be sufficient.

The processing of the first matrix, the 'correlation matrix', to produce the second matrix, the 'orthogonalizing matrix', may comprise determining the inverse of the square root of the correlation matrix. This may be applicable if, for example, it is known or expected that the correlation matrix will consist of values which are wholly or substantially real-valued. So, the matrix square root D of the correlation matrix R may be found, defined by DD=R and then the inverse of that may be found, namely inv(D).

Alternatively the second matrix may be produced by a process involving a decomposition, for example the Cholesky decomposition, which decomposes a correlation matrix, which may be complex, into a product of a matrix with the Hermitian conjugate of itself defined by D*D=R (where * denotes Hermitian transpose). Using a Cholesky decomposition has the advantage that the second matrix, derived by matrix inversion from the matrix obtained via the Cholesky decomposition, should have a triangular form, in which some of the terms typically have a value of 0, so that the process of processing interference product streams by applying the second matrix in the form of weights is simplified, as some weights will typically have the trivial values of 0. The method according to an embodiment of the invention may involve Cholesky decomposition of either the inverse of the correlation matrix or alternatively calculating the inverse of the decomposition. The latter order may have the advantage of simplifying the matrix inverse calculation as the Cholesky decomposition will typically result in a triangular matrix.

Figure 8:
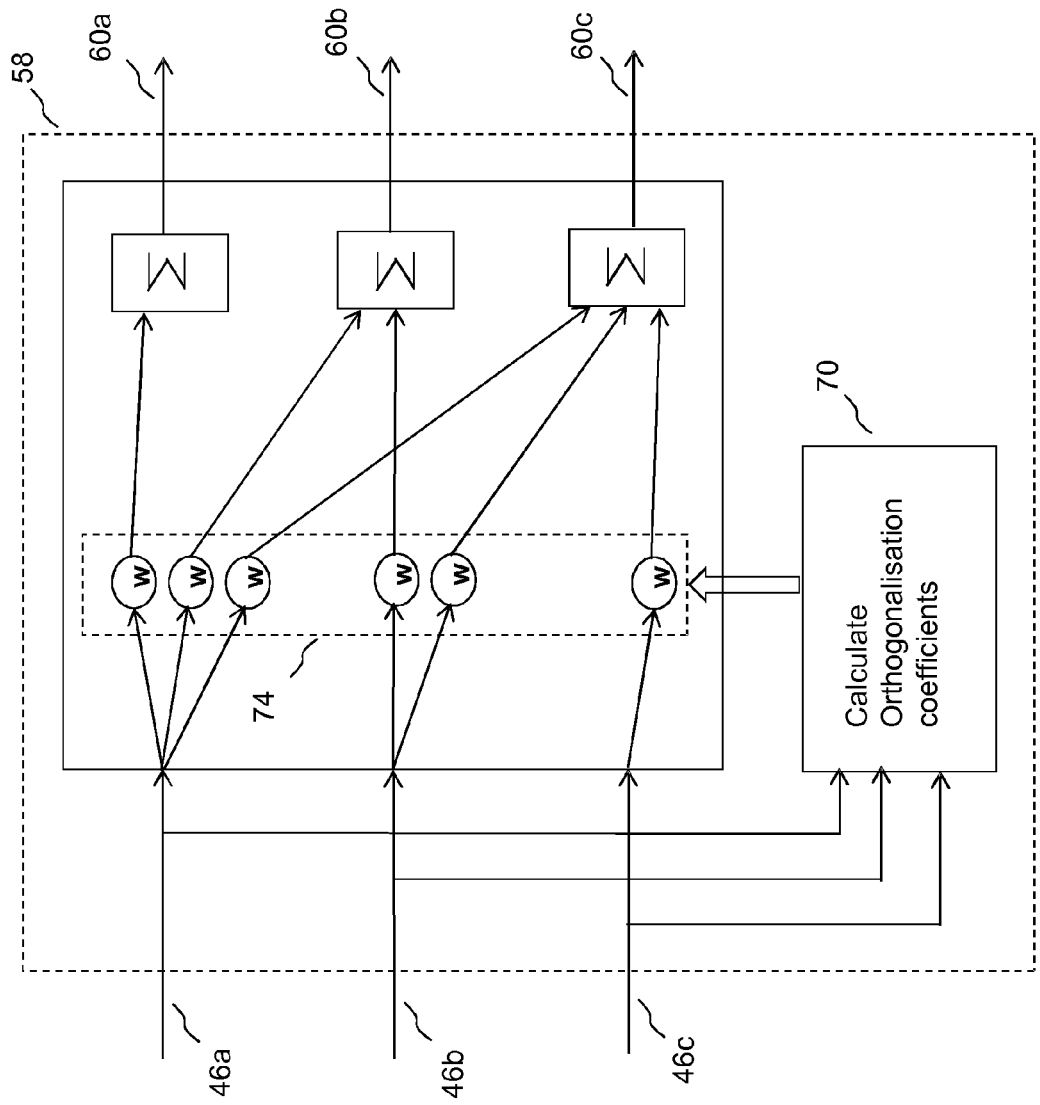
FIG. 8 is a schematic diagram showing reduction of correlation between interference product streams in an embodiment of the invention using a reduced set of weighting functions.

FIG. 8 illustrates a reduced weighting matrix, in which a subset of weights in the weighting matrix of FIG. 7 having non-zero values is shown, such as may be produced by a Cholesky decomposition process.

Figure 9:
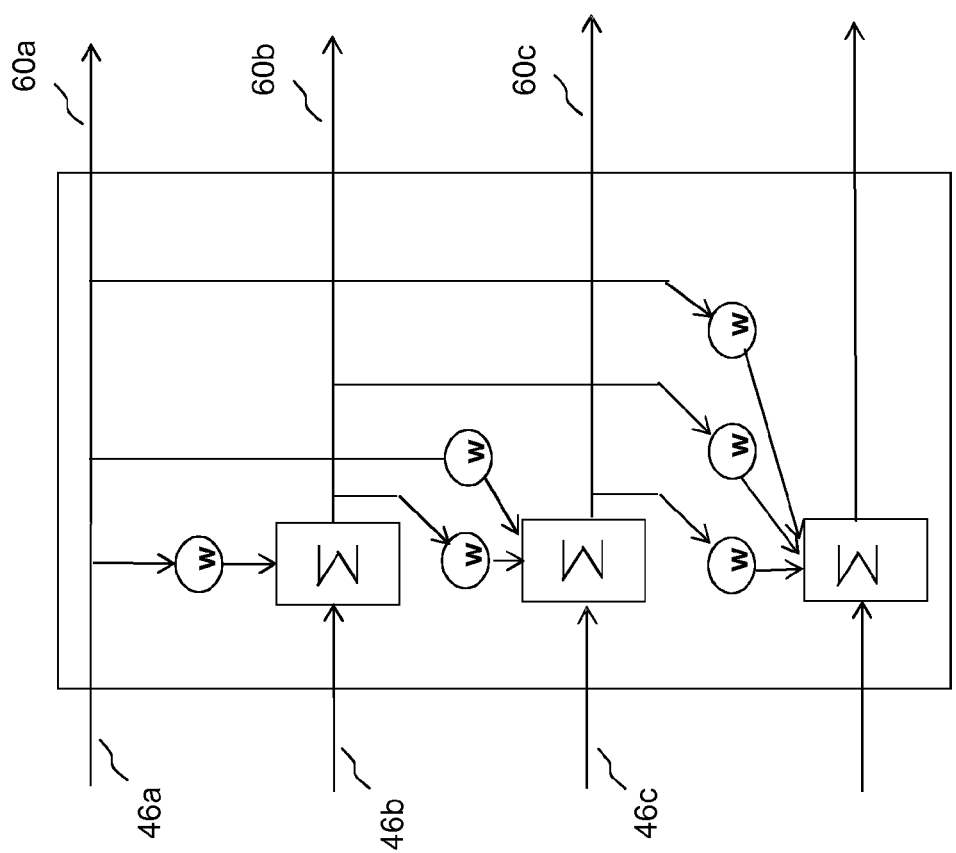
FIG. 9 is a schematic diagram showing reduction of correlation between interference product streams in an embodiment of the invention illustrating a successive decorrelation method.

FIG. 9 illustrates an alternative approach to the linear combination of interference product streams, involving vector decomposition, which may be according to a Gram-Schmidt orthogonalization process. In this approach, a first interference product stream 46a is used as the first of the orthogonalized interference product streams 60a. A sample of the first interference product stream is then weighted and combined with a second interference product stream 46b, in such a way as to reduce the correlation between the first and second streams. In effect, the weight is arranged to cancel the component of the first interference product stream that is correlated with the second interference product stream, over a period in which samples of each stream are taken. This may be achieved by vector decomposition of the second interference product stream into a decomposed interference product stream which is arranged to be correlated with the first interference product stream, and from this, by the Gram-Schmidt process, a second decomposed interference product stream is produced which is arranged to be substantially orthogonal to the first interference product streams. The second decomposed interference product stream then forms the second orthogonalized interference product stream 60b.

The process continues by processing of a third interference product stream to reduce the correlation with the first and second processed streams. Samples of the first interference product stream and the second orthogonalized interference product streams are respectively weighted and combined with the third interference product stream 46c, in such a way as to reduce the correlation with the first stream and the second orthogonalized stream. The weights are arranged to cancel the component of the first interference product stream that is correlated with the third interference product stream, and the component of the second orthogonalized interference product stream that is correlated with the third interference product stream over a period in which samples of each stream are taken. This may be achieved by vector decomposition of the third interference product stream into a decomposed interference product stream which is arranged to be correlated with the first interference product stream, a decomposed interference product stream which is arranged to be correlated with the orthogonalized second interference product stream, and from these, by the Gram-Schmidt process, a third decomposed interference product stream is produced which is arranged to be substantially orthogonal to both the first interference product stream and the second interference product stream. The third decomposed interference product stream then forms the third orthogonalized interference product stream 60c. The process continues in this manner for the other interference product streams, each of which is orthogonalized with respect to the preceding orthogonalization streams.

The weights shown in FIG. 9 have an equivalent effect to a weighting matrix as shown in FIG. 8 in terms of orthogonalization of the interference product streams. However, the configuration of FIG. 9 illustrates a sequential decorrelation approach to orthogonalization of the streams. The linear sequential processing of FIG. 9, whereby some outputs are dependent on the values of other outputs, can be redrawn with a structure akin to either of those of FIG. 7 or FIG. 8, whereby all outputs are given by direct linear combinations of the inputs at the same instant. In restructuring the orthogonalization process in this way some of the weights, w, would take different values, which can be computed as appropriate linear combinations of the weights from FIG. 9. Also, the process to calculate weights to orthogonalize a set of correlated signals can be accomplished using other methods such as taking the inverse of the upper triangular 'R' matrix from the QR decomposition of a column matrix containing the correlated input streams. This QR decomposition itself could be achieved using any one of a number of methods, including the Gram-Schmidt orthogonalization method already described, but also including alternative and potentially more numerically stable approaches such as Givens rotations or Householder transformations.

The vector decomposition process, as described, may be performed using a block of data representing interference product streams received over a first time period, but the weights calculated may be valid for an extended period, as for the matrix approach, if the correlation between the streams is slowly varying in time. Accordingly, it may be possible to perform the vector decomposition process infrequently in non-real time, for example as the process of calculating orthogonalization coefficients shown in FIG. 7, and apply a weighting matrix 74 as a real time process to orthogonalize the interference product streams.

In the case that the processing of the interference comprises detecting the presence of a non-linear product of at least the first signal in the interference, this is done in dependence on at least one of the plurality of respective correlation values. For example, a threshold may be set, and if a correlation value exceeds the threshold, an indication that the respective non-linear value is present may be generated. For example, a network management system and/or an operator may be alerted that interference comprising the non-linear product has been detected. It may be identified which non-linear products are present in the interference in dependence on the plurality of respective correlation values, so that specific non-linear products may be detected. This may be done with greater confidence than may be the case with un-processed interference product streams. It may be identified to which exponent value a non-linear product present in the interference relates in dependence on at least one of the plurality of respective correlation values, so that a specific exponent value to which a non-linear product relates may be detected with greater confidence than may be the case with un-processed interference product streams. In this way, it may be identified which exponent values relate to non-linear products present in the interference in dependence on the plurality of respective correlation values. The exponent value to which a specific non-linear product relates is typically known since this information is used to generate the non-linear product: for example, the third order product $5/4\ A^4\ B\ \cos(2a-b)$ is known to be an exponent 5 term, as already mentioned. Hence if this specific third order product is detected, it may be determined that exponent 5 terms are contributing to the interference. This information may be useful in predicting which frequency bands may experience interference outside the frequency band of the received waveform, since further exponent 5 terms may be expected, and these may fall outside the frequency band of the received waveform.

The functional blocks of a canceller/detector 20 in embodiments of the invention, for example as shown in FIGS. 4 to 9, may be implemented by means of a processor, typically a digital signal processor. The processor may be implemented using dedicated hardware or firmware logic such as a field programmable gate array, or as a processor arranged to execute computer readable instructions to carry out the functions of the functional blocks, or as a combination of hardware and software elements. Well known methods of implementing digital signal processing and control functions may be used.

The above embodiments are to be understood as illustrative examples of various embodiments of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing interference in a waveform received at a device in a wireless network, the interference comprising non-linear products of at least a first signal, the method comprising:
    generating, on the basis of at least the first signal, a plurality of interference product streams, each interference product stream comprising a stream of baseband time samples of a simulated non-linear product of at least the first signal;
    processing at least two of the plurality of interference product streams to reduce a degree of correlation between said at least two interference product streams thereby producing at least two processed interference product streams;
    correlating said at least two processed interference product streams with the waveform received at the device in the wireless network and downconverted to baseband to produce a respective correlation value; and
    processing the interference in dependence on the respective correlation values.

2. The method of claim 1, wherein said processing of the at least two of the plurality of interference product streams comprises:
    generating at least one processed interference product stream that is a linear combination of the at least two of the plurality of interference product streams.

3. The method of claim 2, wherein each time sample of said at least one processed interference product stream is a linear combination of each corresponding time sample of the at least two of the plurality of interference product streams.

4. The method of claim 1, wherein said processing of the at least two of the plurality of interference product streams to reduce a degree of correlation between said at least two interference product streams comprises:
    processing a correlation matrix representing correlations between the plurality of interference product streams to produce a second matrix; and multiplying the at least two interference streams by the second matrix to produce the processed interference streams.

5. The method of claim 4, comprising:

calculating the correlation matrix on the basis of samples of the plurality of interference product streams received during a first period; and performing said processing of the plurality of interference product streams to reduce the degree of correlation between said at least two interference streams using samples of the plurality of interference product streams received during a second period, different from the first period.

6. The method of claim 5, wherein the correlation matrix represents statistical properties of the plurality of interference product streams received during the first period.

7. The method of claim 6, wherein said statistical properties comprise an amplitude distribution.

8. The method of claim 4, wherein said processing the correlation matrix to produce the second matrix comprises determining the inverse of the square root of the correlation matrix.

9. The method of claim 4, comprising producing the second matrix by a process involving a Cholesky decomposition and a matrix inversion.

10. The method of claim 1, wherein said processing the at least two interference product streams to reduce a degree of correlation between said at least two interference product streams comprises:

vector decomposition of at least one of the at least two interference product streams into:
  a first decomposed interference product stream which is arranged to be substantially correlated with a first of the at least two interference product streams; and
  a second decomposed interference product stream which is arranged to be substantially orthogonal to the first of the at least two interference product streams: and
selecting the second decomposed interference product stream as one of the processed interference product streams.

11. The method of claim 10, wherein said processing the at least two interference product streams to reduce a degree of correlation between said at least two interference product streams comprises a Gram-Schmidt orthogonalization process.

12. The method of claim 1, comprising processing at least the first signal at baseband to generate the plurality of interference product streams comprising non-linear products at baseband.

13. The method of claim 1, comprising:

frequency shifting a processed interference product stream to align in frequency with a downconverted non-linear product in the interference to the received waveform.

14. The method of claim 1, wherein said non-linear products of at least the first signal comprise at least one passive intermodulation (PIM) product of the first signal and a second signal.

15. The method of claim 1, wherein said non-linear products of at least the first signal comprise at least one passive harmonic (PH) product of the first signal.

16. The method of claim 1, comprising generating the plurality of interference product streams on the basis of samples of at least the first signal derived at baseband from a downlink data stream from a base station baseband unit to a remote radio head unit.

17. The method of claim 16, wherein the downlink data stream is Common Public Radio Interface (CPRI) or Open Base Station Architecture Initiative (OBSAI) data stream.

18. The method of claim 1, wherein said processing of the interference comprises:

weighting processed interference product streams in dependence on the respective correlation value for the stream; and combining each weighted processed interference product stream with the received waveform comprising the interference, whereby to reduce the interference in the received waveform.

19. The method of claim 1, wherein said processing of the interference comprises:

detecting the presence of a non-linear product of at least the first signal in the interference in dependence on at least one of the plurality of respective correlation values.

20. The method of claim 19, comprising identifying which non-linear products are present in the interference in dependence on the plurality of respective correlation values.

21. The method of claim 19, comprising identifying to which exponent value a non-linear product present in the interference relates in dependence on at least one of the plurality of respective correlation values.

22. The method of claim 19, comprising identifying which exponent values relate to non-linear products present in the interference in dependence on the plurality of respective correlation values.

23. An apparatus for processing interference in a waveform received at a device in a wireless network, the interference comprising non-linear products of at least a first signal, the apparatus comprising:

a processor configured to generate, on the basis of at least the first signal, a plurality of interference product streams, each interference product stream comprising a stream of baseband time samples of a simulated non-linear product of at least the first signal;

process at least two of the plurality of interference product streams to reduce a degree of correlation between said at least two interference product streams thereby producing at least two processed interference product streams;

correlate said at least two processed interference product streams with the waveform received at the device in the wireless network and downconverted to baseband to produce a respective correlation value; and process the interference in dependence on the respective correlation values.

* * * * *